H. A. SALLOP.
SPARE TIRE COVER.
APPLICATION FILED FEB. 26, 1910.
1,047,303.
Patented Dec. 17, 1912.
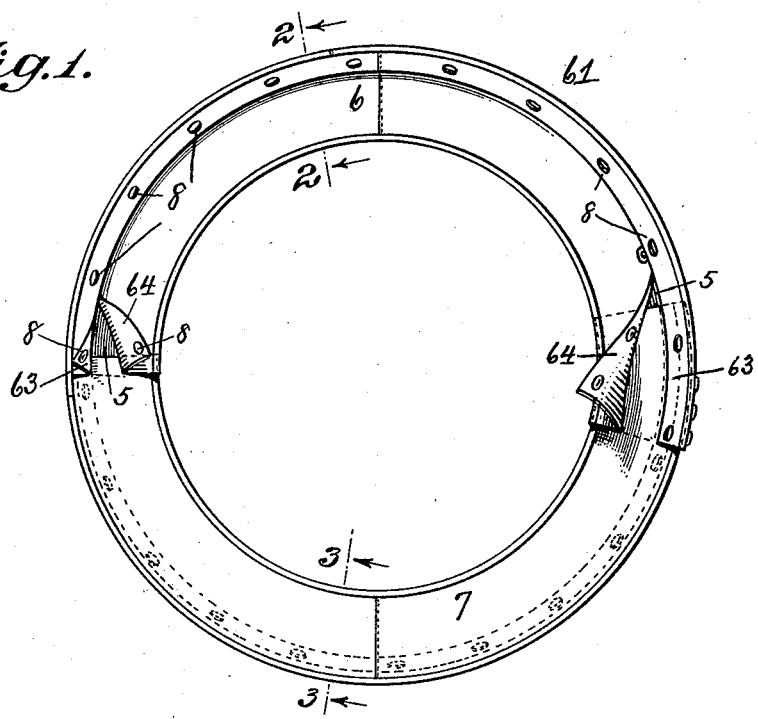
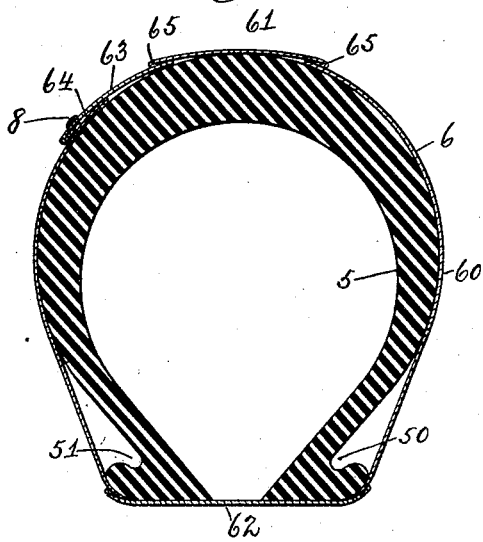
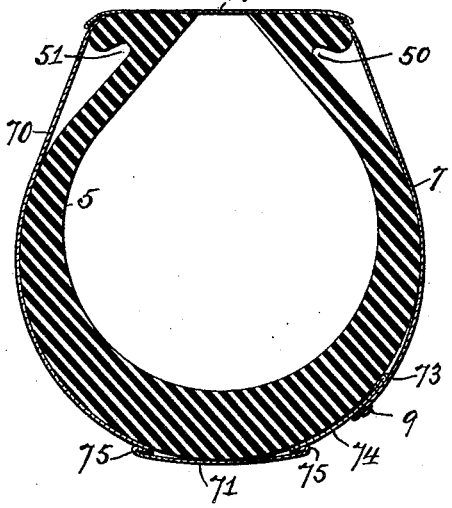
Attest:
Edna A. Moreland
Alan C. McDonnell
Henry A. Sallop, Inventor:
by William R. Baird
his Atty.

UNITED STATES PATENT OFFICE.

HENRY A. SALLOP, OF NEW YORK, N. Y.

SPARE-TIRE COVER.

1,047,303.　　　　　　Specification of Letters Patent.　　　Patented Dec. 17, 1912.

Application filed February 26, 1910. Serial No. 546,143.

*To all whom it may concern:*

Be it known that I, HENRY A. SALLOP, a citizen of the United States, and resident of New York, N. Y., have invented certain new and useful Improvements in Spare-Tire Covers, of which the following is a specification.

This invention relates to covers for spare tires for automobiles and the like and its novelty consists in the construction of the parts as will be more fully hereinafter pointed out.

One object of the invention is to provide a tire cover containing a relatively small quantity of material so that it will be inexpensive and light; another is to provide one which can be readily and quickly made and assembled; a third is to provide a tire cover which can be quickly put in place and removed.

In the drawings, Figure 1 is a front elevation of a tire cover embodying the invention, Fig. 2 is a transverse sectional view on the plane of the line 2—2 in Fig. 1, and Fig. 3 is a similar transverse sectional view on the plane of the line 3—3 in Fig. 1.

Referring to the drawings, 5 is the tire which is made of the usual horse-collar shape in cross section and is provided with the annular recesses 50 and 51 extending around the same.

The cover is made of two parts 6 and 7, both substantially alike, one designed to cover the upper half of the tire (when in the position shown in Fig. 1) and the other designed to cover the lower half of the tire. The upper section 6 consists of a half ring constituting in effect a tubular body 60 adapted to encircle about one-half of the tire. It comprises an outer peripheral strip 61 secured to or made integral with the body 60 and an inner peripheral strip 62 also secured to or made integral with the body 60 and its two flaps 63 and 64 meet at a point near the outer edge of the annulus, the outer flap 63 extending over and upon the inner flap 64, the two flaps being secured together by press fasteners indicated at 8. The peripheral strip 61 is preferably made by folding in the fabric upon itself as at 65, 65 on each longitudinal edge so as to impart a certain desirable degree of stiffness and rigidity to the structure. The lower section 7 is made just like the upper section 6. It consists of a half ring constituting in effect a tubular body 70 adapted to encircle the second half of the tire. It comprises an outer peripheral strip 71 secured to or made integral with the body 70 and preferably made by folding the fabric in upon itself at 75, 75. It also comprises an inner peripheral strip 72 secured to or made integral with the body 70. Its longitudinal flaps 73 and 74 meet at a place near the outer edge of the annulus and the outer flap 73 is secured down upon the inner flap 74 by press fasteners indicated at 9, 9.

The tire and cover are shown in Fig. 1 in the position they occupy when hung upon the vehicle for transportation and in this position the tread of the tire at the top is the uppermost portion while at the bottom the tread is the lowermost portion, and the front face of the tire is shown in this figure.

It will be observed that the overlapping edges of the section 6 of the cover which incloses the upper half of the tire, are on the front face, as will be seen in full lines in Fig. 1 and in the sectional view in Fig. 2, while the overlapping edges of the section 7 of the cover which incloses the lower half of the tire, are on the rear face of the tire, as is shown by the dotted line around the lower half of the tire in Fig. 1 and the sectional view in Fig. 3.

The two sections 6 and 7 are preferably secured together at one end by stitching or any other suitable means, and at their opposite ends their tubular extremities overlap slightly, each section being made a little larger than a semiannulus for that purpose.

It will be noted that the press fasteners 8, 8 of the section 6 and the similar fasteners 9, 9, of the section 7 are annularly arranged at places on the tire where the latter is solid and completely away from the depressions 50 and 51, so that while the edges of the tire cover overlap on opposite sides on the upper and lower halves of the tire in such a way as to completely protect the tread side of the tire (the tread being up in the upper half and down in the lower half), yet they are each opposite a hard, firm surface of the tire affording an adequate support for the lower member of the press fastener and resistance of inward pressure so that the cover is readily and quickly fastened. This arrangement permits also of the use of a relatively small number of fasteners as they are farther away from the center of the annulus and the tubular body of the cover is not much curved between them. As the fasteners are toward the outer edge of the annulus they are readily reached, and the overlapping edges of the cover always turn toward the transverse center of the tire while its inner peripheral strips afford no opportunity for catching dirt or water because the opening between the flaps is always turned away from the direction of their likely entrance. It will be further noted that the edge of the overlapping flap 63 of the section 6 and the edge of the overlapping flap 73 of the section 7, while the former is on the outer face and the latter on the inner face, are both outside of the transverse center of the tire and both face downward to shed water dropping on the cover. The outer peripheral strip 61 of section 6 protects the upper and outer edge of the tire while the inner peripheral strip 72 of section 7 protects the upper and inner edge of the lower half of the tire.

What I claim as new is:—

1. A cover for a spare tire comprising two sections, one adapted to cover and protect the upper half of the tire, and the other to cover and protect the lower half of the tire, the upper section having the opening to receive the tire in the front and the lower section having the opening to receive the tire in the rear, each section having an edge to rest upon the tire provided with a semiannularly arranged row of the button members of press fasteners supported against the hard part of the tire near the tread, and a second overlapping edge carrying a similarly arranged row of socket members to be pressed upon and engage said button members.

2. A cover for a spare tire comprising two sections to cover and protect respectively the lower and the upper half of the tire, the lower section comprising an edge to rest against the tire at a line on the rear face near the tread and an overlapping edge, and press fasteners on the edges in position to be fastened together by pressure against a hard part of the tire, the upper section substantially similar to the lower section secured at one end to the lower section and having its opposite end overlapping the corresponding end of the lower section, said upper section having one edge resting against the front face of the tire near the tread, and its other edge overlapping the same, the two overlapping edges carrying press fasteners to be secured by pressure against a hard part of the tire.

3. A cover for spare tires composed of two, similarly constructed, sections adapted to inclose respectively the upper and lower halves of a tire, each section being provided with main body portions adapted to be wrapped transversely around the tire, having along the edges the two parts of press fasteners arranged to rest on the hard portions of the tire near the rim, the ends of the sections being constructed to slightly telescope, the overlapping joints of the upper section being on the front of the upper half of the tire and those of the lower section being on the rear of the lower half of the tire.

Witness my hand this 25th day of February 1910, at New York, N. Y.

HENRY A. SALLOP.

Witnesses:
E. W. Scherr, Jr.,
Alan C. McDonnell.

---

Copies of this patent may be obtained for five cents each, by addressing the "Commissioner of Patents, Washington, D. C."